UNITED STATES PATENT OFFICE 2,182,431

DEHYDROGENATION OF ORGANIC COMPOUNDS

Herbert P. A. Groll, Berkeley, and James Burgin, Oakland, Calif., assignors to Shell Development Company, San Francisco, Calif., a corporation of Delaware No Drawing. Application July 15, 1935, Serial No. 31,450

4 Claims. (Cl. 260—683)

This invention relates to a process for the treatment of organic compounds whereby the treated compound is converted to an unsaturated compound containing fewer hydrogen atoms but the same number of carbon atoms to the molecule.

More particularly, the invention relates to a catalytic dehydrogenation process which comprises contacting a dehydrogenatable organic compound, under substantially anhydrous conditions, with an activated alumina catalyst at an elevated temperature and for a time sufficient to effect dehydrogenation at a practical rate while avoiding conditions at which substantial cracking of the treated material or reaction products occurs.

While providing a process broadly applicable with excellent results to the dehydrogenation of organic compounds, it is a particular object of our invention to provide a practical and economical method for the technical-scale conversion of the saturated hydrocarbons, such as are contained in or derived from petroleum and petroleum products, to the commercially valuable olefines.

The olefines of the aliphatic series are valuable raw materials for many purposes. They are readily convertible into valuable products of industrial importance as alcohols, ethers, esters, chlorhydrins, glycols, acids, olefine oxides, etc. In addition, the higher olefines and the olefine polymerization and condensation products are useful as solvents and as fuels and as components which impart anti-knock and better burning qualities to fuel mixtures.

The dehydrogenation of hydrocarbons is described in the literature. A variety of processes, catalytic and non-catalytic, have been proposed. Due to the low yields of unsaturates obtained and the difficulties of control so as to avoid excess cracking, the proposed processes have failed to provide an economical, commercially feasible process.

It is known that at the higher temperatures the paraffins undergo pyrolysis whereby small amounts of olefines are obtained. In addition to the dehydrogenation which occurs to a very limited and impractical extent, the mechanism of the pyrolysis, due to the high temperatures necessitated, involves disruption of the carbon chain, resulting in the formation of compounds containing fewer carbon atoms and occasioning material losses due to carbon formation, polymerization and condensation. If temperatures sufficiently low to avoid excessive cracking are employed, the dehydrogenation reaction proceeds so slowly that equilibrium conditions are practically unattainable and the yields of olefines are commercially insignificant.

Numerous catalysts have been proposed for accelerating the dehydrogenation reaction. The majority of these catalysts are too active and their efficient use requires the employment of low temperatures and high space velocities if disruption of the hydrocarbon molecule is to be avoided. For example, nickel is a very active dehydrogenation catalyst but it is unsuitable due to the fact that its efficient use requires such low temperatures that equilibrium conditions are reached when only a small amount of the treated material has been dehydrogenated, or such high space velocities that only a very small percentage is converted. Less active catalysts have been suggested but the same marked disadvantages are also inherent in their use. They cannot be efficiently employed in technical scale dehydrogenation processes at practical space velocities and at temperatures at which optimum conversions are attained while cracking is substantially avoided.

Now we have found a catalyst the use of which brings the dehydrogenation of hydrocarbons within the field of practical utility. Our process comprises the use of an activated alumina catalyst under substantially anhydrous conditions. We may employ relatively low space velocities and maintain a high production of unsaturates per time unit while employing temperatures at which optimum practical conversions are attained while substantially no cracking occurs.

The alumina employed can be prepared in a wide variety of suitable manners from readily obtainable and inexpensive materials. Said alumina may be activated by any of the methods known to the art. For example, the prepared alumina may be activated and rendered suitable for our purpose by calcining it at a temperature of from about 300° to about 800° C. If desired, aluminum hydrate prepared in any suitable manner may be converted to an activated alumina catalyst directly by heating it in this temperature range. The activation of the alumina is probably due to the change in physical structure by reason of partial or complete dehydration occasioned by the calcination. The activation may be effected under any suitable pressure. As a raw material in the preparation of an activated alumina catalyst, we may employ aluminum hydrate such as is deposited from sodium aluminate solutions in the alumina precipitation tanks used in the Fickes-Sherwin modification of the Bayer process.

In addition to those herein described, other suitable modes of preparing and activating the alumina catalyst will be apparent to those skilled in the art. Conditions of preparation and activation of the catalyst should be such that the catalytic material is obtained in a porous form, since physical structure and surface phenomena may play a large part in its effectiveness.

Activated alumina is a very economically employed catalyst due to its great stability under the conditions of its optimum activity. It retains its form with repeated use and reactivation over long periods. It is resistant to poisoning and retains its initial activity over long periods of continual use and, when there is a loss of activity due to poisoning, fatigue or tar and/or carbon deposition, the initial activity is readily and inexpensively restored.

The catalytic material in any suitable solid form as powder, granules, pellets, etc. or deposited on an inert carrier or in admixture with an inert material is employed in manners customary in catalytic processes of this type. The desired quantity of the catalytic material, preferably in the form of granules, may be packed into a reaction chamber of any suitable material and heated to and maintained at the desired temperature while the substantially dry material to be treated is passed into contact with it, preferably in the vapor phase at the desired space velocity and under the desired pressure of operation.

The term "space velocity" as used herein may be defined as the number of units of volume of gaseous material, measured at 0° C. and 76 cm. of $H_g$, contacted with a unit volume of catalyst per hour.

The invention is preferably executed at temperatures of from about 500° C. to about 800° C. In some cases, higher or lower temperatures may be used. At lower temperatures the catalysts are less active and prohibitively low space velocities are required to attain practical conversions. At temperatures greater than about 800° C., prohibitively short contact times are required if cracking is to be avoided. As a consequence, the conversions are low due to the fact that equilibrium is not attained. The dehydrogenation of the lower paraffin hydrocarbons is preferably effected at temperatures below about 700° C. Although the catalyst may be more active at higher temperatures, the rate of loss of activity is also greater and the process is generally more economically executed at lower temperatures at contact times favoring equilibrium conditions. The temperature to be employed is dependent upon the particular compound to be dehydrogenated, upon the space velocity, and upon the pressure of operation.

The space velocity to be employed is dependent upon the particular compound or compounds to be treated and upon the other conditions of operation as temperature, pressure, etc. With each particular compound or mixture of compounds, the temperature and space velocity can be so regulated that we may obtain practical conversions at a rate at which substantially no cracking occurs.

In the dehydrogenation of the paraffin hydrocarbons, a greater production of the corresponding olefine per time unit and per quantity of catalyst is generally obtained when the space velocities near the upper limit of the suitable range are employed. This advantage is, however, usually off-set by the lower olefine content of the effluent gas and by the relatively much shorter period of activity of the catalyst.

The invention is preferably executed in the substantial absence of water. Prior to their contact with the catalytic material, the materials to be treated, if they contain water in detrimental amounts, may be dried in either the gaseous or liquid phase by any of the methods known to the art as, for example, by contact with drying agents as dehydrated calcium chloride, potassium carbonate, sodium sulphate and the like. To avoid the formation of water during the course of the reaction, care is taken to exclude the presence of oxygen and oxygen-containing mixtures. To exclude the presence of air, the reaction chamber containing the catalyst is preferably flushed out with an inert gas, as nitrogen, prior to its use.

Loss of activity of the catalyst, in the absence of specific catalyst poisons, is probably due to the deposition of carbon on the surface thereof in accordance with the reaction $$C_nH_{2n+2} \rightarrow nC + (n+1)H_2$$

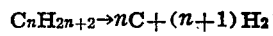

which occurs to a very limited extent simultaneously with the dehydrogenation reaction. Reactivation of the catalyst as herein described comprises removal of the deposited carbon by oxidizing it to carbon dioxide whereby the activity of the catalyst is restored.

The rate at which the catalyst loses its activity is principally dependent upon the temperature and space velocity at which the invention is executed. When the catalyst has lost its activity to the extent that its use is no longer practical, it can be easily and economically reactivated and its initial activity substantially restored without removing it from the catalyst chamber. The reactivation is effected by passing air or other suitable oxygen-containing gases into contact with the heated catalytic material. If desired the reactivation may be effected in the presence of an added inert gaseous material as steam, carbon dioxide, nitrogen, etc. For example, the catalyst may be reactivated by passing a mixture of steam and air over the heated catalyst. The reactivation may also be achieved by oxidation of the deposited carbon with carbon dioxide or steam alone. However, steam may harm the structure of the catalyst while with carbon dioxide the temperature required for the reactivation may become too high to be practical. The catalyst is maintained at a temperature of from about 500° C. to about 800° C. while air is passed over it at a space velocity of from about 150 to 500. After combustion has started the temperature of the catalyst can be controlled by regulating the flow of air. Temperatures above 800° C. are to be avoided since the activity of the catalyst may be permanently destroyed due probably to a change in physical structure. The time necessary to substantially restore the activity of the catalyst is dependent upon the amount of air or other oxidizing gas passed over it per time unit and upon the relative amount of carbon deposited thereon. When the process is executed under optimum conditions of temperature and space velocity employing granules of activated alumina packed in a reaction tube having an average inside diameter of 2.0 cm. and a heating length of about 50 cm., the reactivation is advantageously effected by passing air at the rate of about 500 cc./min. (space velocity about 191) over the catalyst maintained at about 600° C. to 700° C. until no more $CO_2$ can be detected in the effluent gas. Under these conditions, to substantially restore the catalyst to its initial activity, one hour of reactivation is required for every eight hour period that the catalyst has been in use subsequent to the last reactivation. The catalyst may be repeatedly reactivated as above described, its initial qualities as a catalyst being restored at the end of each cycle.

Our process is broadly applicable to the dehydrogenation of hydrocarbons to compounds containing the same number of carbon atoms but fewer hydrogen atoms. Saturated hydrocarbons may be converted to the corresponding unsaturated compounds possessing one or a plurality of olefinic linkages or unsaturated hydrocarbons may be dehydrogenated to still more unsaturated compounds. For example, cyclo-hexane and cyclo-hexadiene may be converted to benzene, tetra-hydronaphthalene to naphthalene, etc. The invention is applicable with excellent results to the conversion of paraffins containing two or more carbon atoms to the corresponding olefines. For example, the olefines of the same number of carbon atoms are prepared in excellent yields from ethane, propane, normal butane, isobutane, the pentanes, the hexanes, the heptanes and the like and their homologues, suitable substitution products. Such a straight or branched chain hydrocarbon may be linked to a cyclic radical as of the aromatic, alicyclic or heterocyclic series or the compound may comprise an alicyclic structure. For example, compounds as ethyl benzene, ethyl naphthalene and the like and their homologues, analogues and suitable substitution products are contemplated.

The compounds to be dehydrogenated may be treated severally or we may treat mixtures comprising more than one species. If desired, mixtures of one or more compounds to be treated with a relatively inert substance which will preferably exist in the gaseous state under operating conditions may be treated. For example, dehydrogenation may be effected in the presence of materials as stable hydrocarbons, stable olefines, hydrogen, nitrogen, etc. The material present may act as an inert diluent and, in addition, provide a suitable means of increasing the conversion of the material dehydrogenated by decreasing its partial pressure in the gaseous reaction mixture.

In many cases, the dehydrogenation may be advantageously effected in the initial presence of added hydrogen. The added hydrogen may exercise two favorable influences. It may act as a diluent and, in addition, due to the fact that hydrogen is an excellent heat-conducting gas, a more uniform temperature may be maintained in the reaction zone. Although the presence of a considerable quantity of hydrogen, in accordance with the law of mass action, represses the dehydrogenation, this unfavorable effect is more than offset by the higher conversions due to the heat conductivity of the hydrogen.

Another mode of operating so as to decrease the partial pressure of the material to be dehydrogenated comprises effecting the reaction in the presence of a suitable hydrogen acceptor. The dehydrogenation may be effected in the presence of an unsaturated compound which when hydrogenated is less readily dehydrogenated than the material treated. As an example, sufficient ethylene may be mixed with a compound to be dehydrogenated which possesses more than two carbon atoms so that the hydrogen liberated by the dehydrogenation hydrogenates the ethylene to ethane and thus removes free hydrogen from the sphere of reaction. When operating in this manner, the hydrogen acceptor is chosen with respect to the hydrogen donator and the conditions of its dehydrogenation so that the acceptor is more easily hydrogenated than the dehydrogenation product of the donator while the hydrogenated acceptor is less readily dehydrogenated than the donator.

Our invention may be executed at atmospheric, subatmospheric or moderately elevated pressures. Generally, the same is executed at atmospheric or moderately reduced pressures. Another suitable means of increasing the conversion by lowering the partial pressure of the material to be dehydrogenated, comprises effecting reaction under a subatmospheric pressure.

In accordance with the invention, we may treat hydrocarbon mixtures of saturates and unsaturates as occur in natural gas, cracked petroleum, petroleum products and mixtures resulting from the pyrogenetic treatment of shale oil, peat, asphalts, coals, etc. Technical olefine-paraffin-containing mixtures as the propane propylene cut, butane-butylene cut, pentane-amylene cut, etc., may be treated and the ratio of higher olefines to paraffins increased or the cut or the original mixture from which it is derived may be treated by any suitable means as fractionation, condensation, absorption, extraction, etc., and the olefines removed therefrom prior to treatment of the saturates.

Motor fuels such as gasoline which contain small amounts of unsaturates can be improved, in accordance with our process, by passage over the heated activated alumina under the conditions herein specified. In this manner, the ratio of unsaturates to saturates in the fuel can be increased and its anti-knock qualities enhanced.

The following examples are introduced for the purpose of illustrating modes of executing our invention and the results thereby obtained. It is to be understood that the invention is not to be limited to the specific materials or conditions of operation disclosed.

*Example I*

The catalyst employed was commercial activated alumina. About 35 c. c. of this material in the form of granules of about #8 mesh were packed into a quartz reaction tube having an inside diameter of about 1.04 cms. and a heating length of about 65 cms.

The catalyst mass was maintained at a temperature of about 650° C. while substantially dry propane was passed in contact with it at an average space velocity of about 514 (gas flow 300 c. c./min.) for a period of about 4 hours. The average conversion of propane to propylene was about 28.1%.

*Example II*

Activated alumina in the form of granules (8–14 mesh) was packed in a KA2 steel reaction tube having an average inside diameter of 1.6 cm. and a heating length of 50 cms.

Nitrogen was passed through the reaction tube while the temperature of the catalyst mass was raised to about 600° C. The temperature was maintained at about 600° C. while substantially dry isobutane, which had been previously preheated to a temperature of about 475° C., was passed through the catalyst mass at an average space velocity of 198.

The maximum conversion of about 34% isobutane to butylene was attained after about 7 hours of continuous operation. The average conversion for 30 hours of continuous operation was about 24.5%, while at the end of 89 hours of continuous operation the average conversion was still about 21.5%. The effluent gas mixture contained on the average about 20.6% isobutylene.

At the end of this time, the catalyst was regenerated and its initial activity substantially restored in the following manner. The catalyst mass was maintained at a temperature of about 600° C. while air was passed through it at a rate of about 500 cc./min. until no more $CO_2$ could be detected in the effluent gas mixture. During the regeneration, the temperature of the catalyst mass, due to the heat of combustion, reached about 675° C. The catalyst was substantially completely regenerated in about 11 hours.

Example III

The catalyst employed was activated alumina in the form of granules (8–14 mesh).

The dehydrogenation was effected in a $KA_2$ steel tube having an average inside diameter of about 1.65 cm. and a heating length of about 50 cm. The reaction tube was packed with the catalyst and heated to a temperature of about 600° C. while nitrogen was passed through it. When the temperature was at about 600° C., the nitrogen flow was stopped and substantially dry isobutane which had been previously preheated to about 450 to 500° C. was passed through the heated reaction tube at a space velocity of about 198 for a period of 48 hours. The average conversion of isobutane to isobutylene for this period was about 23%.

The catalyst was regenerated by passing air through it at a rate of about 500 cc./min. while the temperature was maintained at from about 600° C. to about 700° C. The regeneration required about 8 hours.

The regenerated catalyst was utilized under substantially the same conditions as the fresh catalyst and was again regenerated and reutilized when there was a substantial decrease in activity.

The following table shows the average butane to butylene conversions obtained over different time periods following repeated regeneration of the catalyst.

| Catalyst $Al_2O_3$ | Average percent conversion isobutane to isobutylene | | | | | | |
|---|---|---|---|---|---|---|---|
| | 4 hrs. | 8 hrs. | 12 hrs. | 16 hrs. | 24 hrs. | 36 hrs. | 48 hrs. |
| Fresh | 31.7 | 32.1 | 30.7 | 29.4 | 26.9 | 24.1 | 23.0 |
| Regeneration No. 1 | 32.9 | 33.8 | 33.0 | 31.8 | 30.0 | 27.2 | 25.5 |
| Regeneration No. 2 | 33.7 | 34.1 | 33.7 | 32.6 | 31.5 | 29.4 | 27.9 |
| Regeneration No. 3 | 25.1 | 29.6 | 30.3 | 30.4 | 29.1 | 27.4 | 25.0 |
| Regeneration No. 4 | 18.0 | 25.0 | 27.6 | 28.6 | 28.5 | 27.4 | |
| Regeneration No. 5 | 12.3 | 15.2 | 19.1 | 22.1 | 25.6 | 27.0 | 26.3 |
| Regeneration No. 6 | 16.1 | 20.8 | 23.7 | 25.2 | 27.5 | 28.4 | |
| Regeneration No. 7 | 12.0 | 16.1 | 19.7 | 22.1 | 24.4 | 25.6 | 25.8 |
| Regeneration No. 8 | 15.5 | 19.4 | 22.5 | 24.5 | 26.1 | 25.1 | |
| Regeneration No. 9 | 18.1 | 22.0 | 23.6 | 24.6 | 25.0 | | |

The average conversion over a 48 hour period was about 25% and since the catalyst was regenerated 9 times, the isobutylene produced per pound of catalyst employed was about 56.2 pounds.

Example IV

An activated alumina catalyst was prepared by dissolving aluminum in an aqueous solution of NaOH and subsequently passing $CO_2$ into the solution to precipitate aluminum hydroxide. The precipitated aluminum hydroxide was separated, washed with water and dried at a temperature of about 600° C. About 35 cc. of the dry activated alumina, in the form of granules, was packed in a quartz reaction tube having an inside diameter of about 1.04 cms. and a heating length of about 65 cm.

The catalyst mass was maintained at an average temperature of about 575° C. while substantially dry normal butane was passed through it at an average space velocity of about 200 for a period of about 3.5 hours. The average conversion of n-butane to butylene was about 25%.

Example V

A commercial activated alumina catalyst in the form of from about 8–14 mesh granules was packed in a steel reaction tube having an inside diameter of about 3 inches and a heating length of about 5 feet.

The packed reaction tube was inserted in a suitable furnace and heated. Nitrogen was passed through the reaction tube to displace the air while the temperature of the catalyst mass was raised to about 600° C. While a temperature of about 600° C. was maintained, substantially dry isobutane, which had been previously preheated, was passed through the packed reaction tube at an average space velocity of about 300 for a period of about 16 hours.

During 16 hours of continuous operation, the average conversion of isobutane to isobutylene was about 30%. A maximum conversion of about 35% was obtained after about 5.5 hours of operation.

The ratio of isobutylene to total olefines in the effluent gas mixture was about 0.75. The average composition of the effluent gas was:

|  | Per cent |
|---|---|
| Isobutylene | 21.6 |
| Lower olefines | 7.0 |
| Ethane-methane | 7.0 |
| Hydrogen | 31.8 |
| Unreacted isobutane | 32.6 |

At the end of the run, the catalyst was reactivated and its initial activity substantially restored by maintaining it at a temperature of from about 600° C. to about 700° C. while passing air through it until no more $CO_2$ could be detected in the effluent gas.

Example VI

A quartz reaction tube having an inside diameter of about 1 cm. and a heating length of about 50 cm. was packed with 8 to 14 mesh granules of an activated alumina catalyst and the packed tube inserted in a suitable electric furnace. The catalyst was maintained at a temperature of about 600° C. while cyclohexane was passed through it at a rate of about 1 cc. of liquid per minute. About 50% of the cyclohexane passed through the reaction tube was dehydrogenated to benzene. The remainder was unchanged cyclohexane and a small quantity of decomposition products.

Example VII

Ethyl benzene vapor was passed through a quartz reaction tube packed with granules of an activated alumina catalyst maintained at a temperature of about 650° C. Distillation of the liquid condensate showed that about 25% of the ethyl benzene treated was converted to styrene. Some benzene and polymers and condensation products were formed. The effluent gas contained about 90% hydrogen.

Our invention may be executed in a batch, intermittent or continuous manner. Dehydrogenatable material that is not completely dehydrogenated on one passage through the reaction chamber may be reutilized in the same or another conversion stage. When executing the invention in an intermittent or continuous manner and recirculating the unreacted material, the conversion may be increased by intermittently or continuously withdrawing one or more of the conversion products from the system. For example, one or a plurality of conversion stages may be in communication with one or more stages wherein the material subsequent to its issuance from the conversion stage or stages is treated for recovery of the unsaturates and/or hydrogen, and the unreacted material recirculated. For example, in the dehydrogenation of paraffins, the effluent gases can be treated to remove their olefine content by passing them into contact with sulphuric acid, sulphonic acid, phosphoric acid, sulphur dioxide, etc. The gases thus denuded of olefines may be recirculated over the catalyst. Alternatively, the exit gas may be brought into contact with a hydrogen-binding material as copper oxide. When the above means are resorted to, the gases can be treated until substantially all of the saturates are converted to unsaturates.

As a suitable means of operating continuously, we may employ a plurality of dehydrogenating units, each in contact with a storage vessel containing the material to be treated, and utilize one or more reaction units while the catalytic material in one or more others is being regenerated as herein described without removing it from the reaction unit. When the catalyst in the converters in use loses its activity to the extent that the conversion per pass is no longer practical, the material to be dehydrogenated is diverted to converters containing active catalyst. It is seen that in addition to providing a process for the technical scale production of valuable unsaturated compounds, the invention provides a novel process for the production of hydrogen.

The terms "dehydrogenation" and "dehydrogenating" as used in this specification and the appended claims are intended to exclude those reactions in which oxygen or its equivalent combines with a hydrogen-containing compound to form a compound containing less hydrogen. Such reactions are entirely different from the type of reaction which occurs in accordance with our invention whereby hydrogen atoms are split from the treated compound resulting in a compound containing less hydrogen and molecular hydrogen.

While we have described our invention in a detailed manner and provided specific examples illustrating suitable modes of executing the same, it is to be understood that modifications may be made and that no limitations other than those imposed by the scope of the appended claims are intended.

We claim as our invention:

1. A process for the catalytic dehydrogenation of a hydrocarbon predominantly to an unsaturated hydrocarbon containing fewer hydrogen atoms but the same number of carbon atoms to the molecule which comprises contacting the substantially anhydrous vapors of a saturated hydrocarbon containing at least two carbon atoms with a catalyst essentially consisting of an "activated alumina", prepared by calcining, at a temperature of from 300° C. to 800° C., an aluminum hydroxide which was slowly precipitated from its aqueous alkaline solution, at a temperature in the practical operating range of 500° C. to 650° C., whereby rupture of carbon-to-carbon bonds is substantially obviated and the treated hydrocarbon is predominantly dehydrogenated to an unsaturated hydrocarbon containing the same number of carbon atoms.

2. A process for the catalytic dehydrogenation of a hydrocarbon predominantly to an unsaturated hydrocarbon containing fewer hydrogen atoms but the same number of carbon atoms to the molecule which comprises contacting the substantially anhydrous vapors of a paraffin hydrocarbon containing at least two carbon atoms with a catalyst essentially consisting of an "activated alumina", prepared by calcining, at a temperature of from 300° C. to 800° C., an aluminum hydroxide which was slowly precipitated from its aqueous alkaline solution, at a temperature in the practical operating range of 500° C. to 650° C., whereby rupture of carbon-to-carbon bonds is substantially obviated and the treated paraffin hydrocarbon is predominantly dehydrogenated to the corresponding olefine containing the same number of carbon atoms.

3. A process for the catalytic dehydrogenation of isobutane predominantly to isobutylene which comprises contacting the substantially anhydrous vapors of the isobutane with a catalyst essentially consisting of an "activated alumina", prepared by calcining, at a temperature of from 300° C. to 800° C., an aluminum hydroxide which was slowly precipitated from its aqueous alkaline solution, at a temperature in the practical operating range of 500° C. to 650° C., whereby rupture of carbon-to-carbon bonds is substantially obviated and the isobutane is predominantly dehydrogenated to isobutylene.

4. A process for the catalytic dehydrogenation of a hydrocarbon predominantly to an unsaturated hydrocarbon containing fewer hydrogen atoms but the same number of carbon atoms to the molecule which comprises contacting the substantially anhydrous vapors of a dehydrogenatable hydrocarbon containing at least two carbon atoms with a catalyst essentially consisting of an "activated alumina", prepared by calcining, at a temperature of from 300° C. to 800° C., an aluminum hydroxide which was slowly precipitated from its aqueous alkaline solution at a temperature in the practical operating range of 500° C. to 650° C., whereby rupture of carbon-to-carbon bonds is substantially obviated and the treated hydrocarbon is predominantly dehydrogenated to an unsaturated hydrocarbon containing the same number of carbon atoms.

HERBERT P. A. GROLL.
JAMES BURGIN.